Dec. 16, 1941.   C. L. SLUYTER   2,266,446
CABLE REELING APPARATUS
Filed Oct. 11, 1939   4 Sheets-Sheet 3
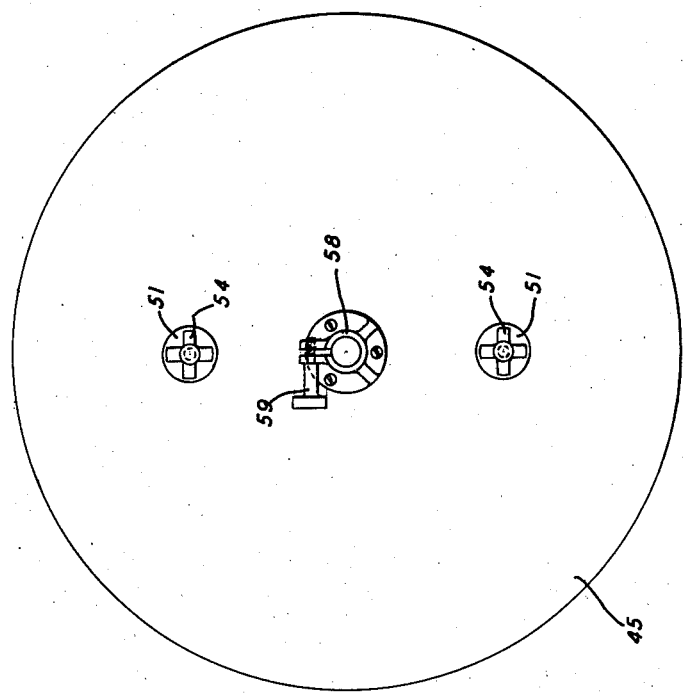
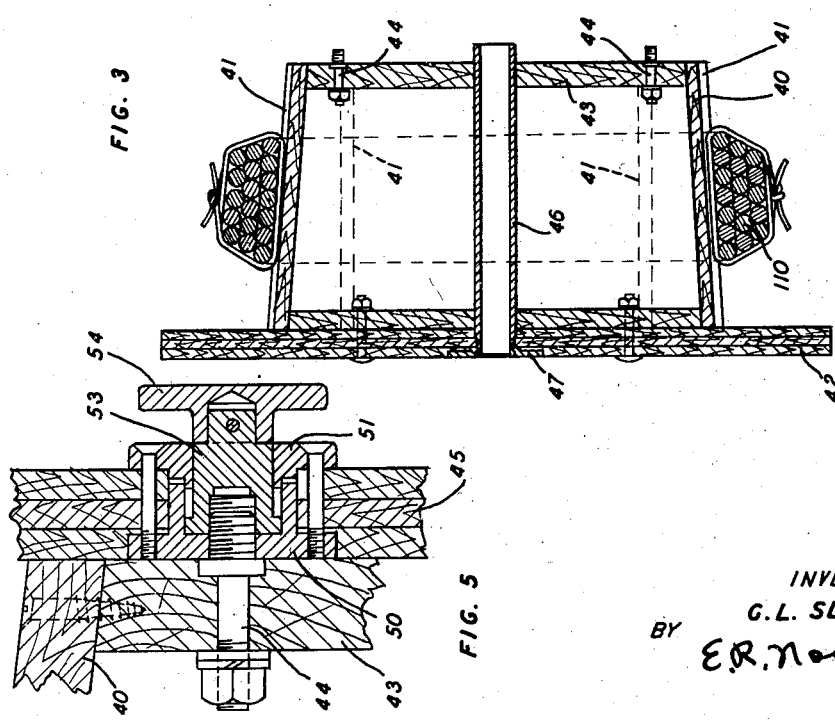
INVENTOR
C.L. SLUYTER
BY
E.R. Nowlan
ATTORNEY Dec. 16, 1941.                C. L. SLUYTER                2,266,446
                         CABLE REELING APPARATUS
                        Filed Oct. 11, 1939          4 Sheets-Sheet 4
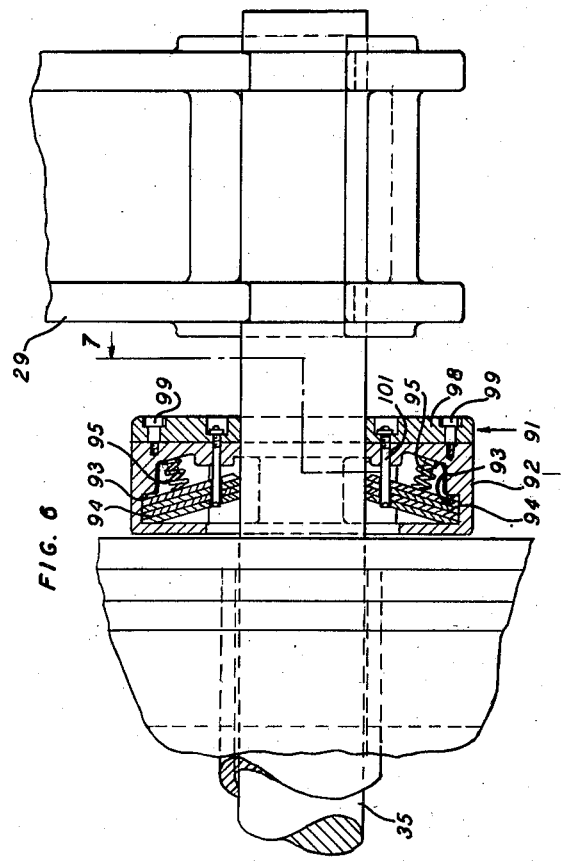
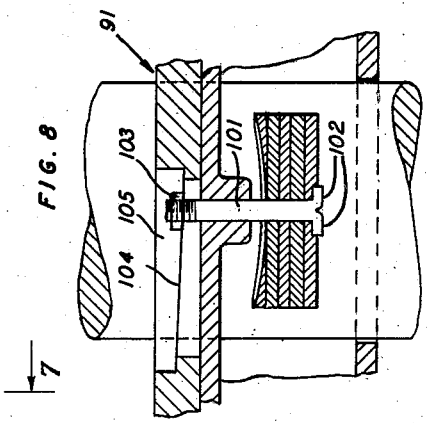
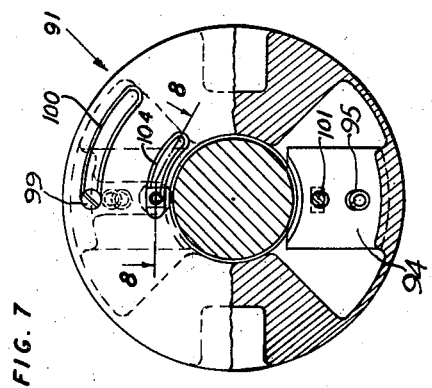
INVENTOR
C. L. SLUYTER
BY E. R. Nowlan
ATTORNEY Patented Dec. 16, 1941

2,266,446

UNITED STATES PATENT OFFICE 2,266,446

CABLE REELING APPARATUS

Charles L. Sluyter, South Orange, N. J., assignor to Western Electric Company, Incorporated, New York, N. Y., a corporation of New York Application October 11, 1939, Serial No. 298,867

4 Claims. (Cl. 242—90)

This invention relates to cable reeling apparatus, and more particularly to an apparatus for rewinding cable from one reel to another and/or for winding desired lengths of cable.

In maintaining telephone service there are frequent requirements for various lengths of various types of telephone cable and due to the weight of such cable it is difficult to remove desired lengths thereof from supply reels and wind them on other reels or form such lengths in coils and tie for shipping without the aid of suitable mechanism by which such may be accomplished.

An object of the invention is to provide a cable reeling apparatus which is simple in construction, efficient in operation, and easy to handle.

With this and other objects in view, the invention comprises a cable reeling apparatus having a portable frame adjustably supporting lifting arms to support a shaft of a reel having a tapered grooved drum and a removable head, the frame being conditioned to be raised and lowered to lift the reel from and return it to the floor and supporting driven friction rollers adjustably movable on the frame toward or away from the heads of the reel to cause rotation thereof to wind desired lengths of cable on the reel, the grooves in the drum facilitating tying the coils of the cable together.

Other objects and advantages will be apparent from the following detailed description when taken in conjunction with the accompanying drawings, wherein Fig. 1 is a side elevational view of the apparatus, portions thereof being broken away;

Fig. 3 is a vertical sectional view of the reel, shown with the head removed;

Fig. 4 is a front elevational view of the removable head for the reel;

Fig. 5 is an enlarged fragmentary sectional view taken along the line 5—5 of Fig. 2;

Fig. 6 is a fragmentary top plan view of a portion of the apparatus, certain features thereof being shown in section;

Fig. 7 is a sectional view taken substantially along the line 7—7 of Fig. 6, and Fig. 8 is an enlarged sectional view taken subtantially along the line 8—8 of Fig. 7.

Figure 1:
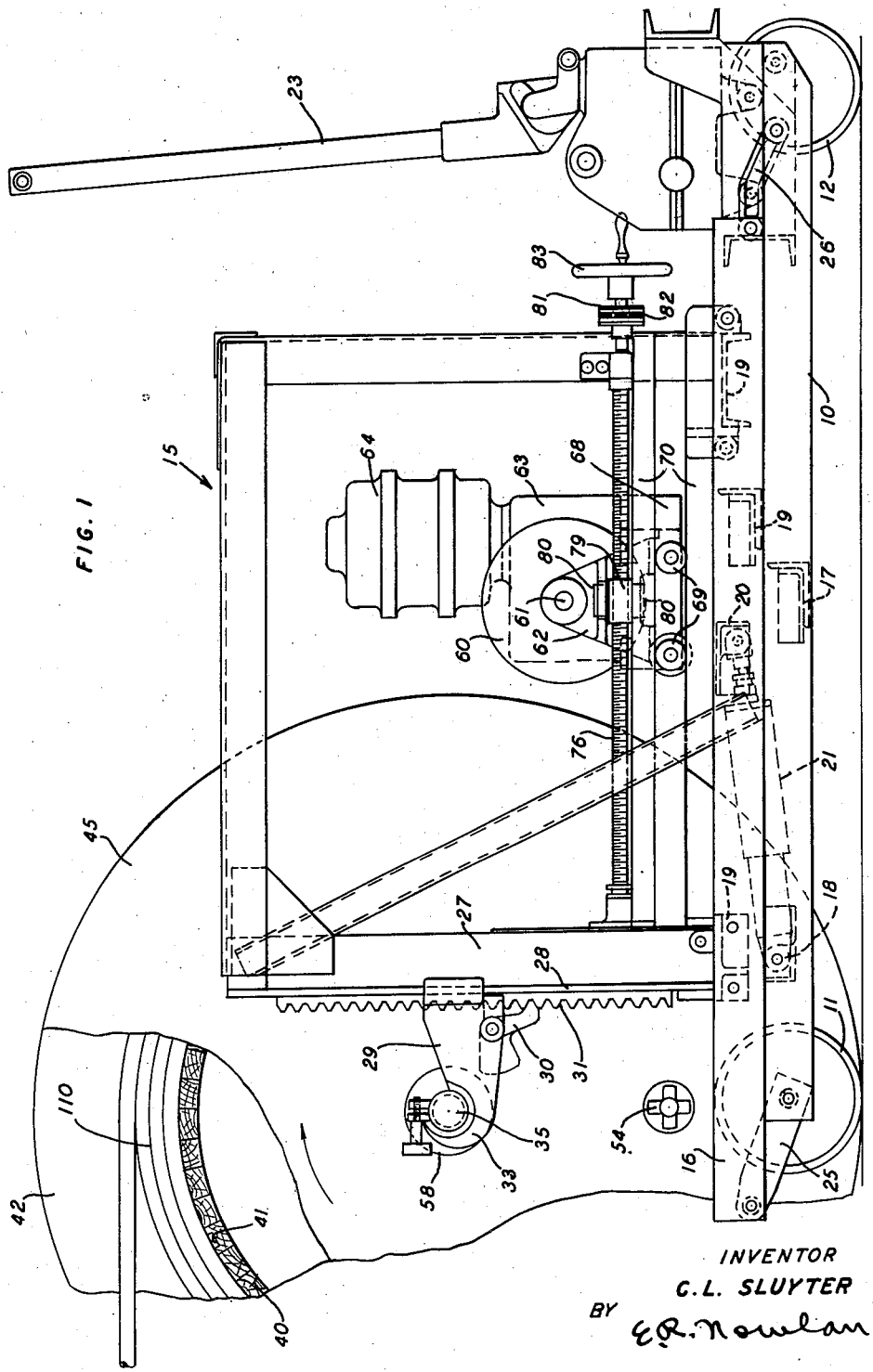

Referring now to the drawings, wherein like reference numerals designate similar parts throughout the views, numeral 10 designates a base mounted upon wheels 11 and 12, there being two wheels 11 disposed at each side of the apparatus near the forward end thereof and one wheel 12 positioned at the center of the rearward end, the latter being pivotally mounted in any suitable manner (not shown) and used in steering the apparatus from one position to another.

Upon the base 10 is disposed a frame, indicated generally at 15, the frame having lower portions 16 positioned to rest upon the base 10 when the frame is in its lowered position. The lower portions 16 of the frame 15 are formed of spaced pairs of substantially parallel strips conditioned to rest upon like spaced pairs of parallel strips which constitute portions of the base 10. Suitable laterally extending reenforcing members 17 and 18 are provided for the base 10, while other laterally extending reenforcing members 19 and 20 are provided for the lower portions 16 of the frame.

Positioned beneath the pairs of strips on each side of the apparatus are lifting members 21 which may be of any suitable mechanism for causing relative movement of the frame and the base. The lifting members 21 in the present instance are hydraulic pistons and cylinders, the pistons being connected to the reenforcing member 18 of the base while the cylinders are connected to the reenforcing member 20 of the f_ame, each connection being pivotal. Suitable means (not shown), through the actuation of a handle 23 or other suitable means, may be provided to force a lubricant into the cylinders to cause relative movement of the cylinders and pistons to move the frame 15.

The forward end of the frame 15 is connected to the base 10 through a set of links 25 having their lower ends pivotally connected to the forward ends of the parallel strips of the base 10 and their upper ends pivotally connected to the forward ends of the parallel strips of the lower portions 16. A set of links 26 serves to connect the other ends of the frame to the base in a similar manner to the securing of the links 25 in place. It will, therefore, be apparent that actuation of the lifting members 21 will cause the frame 15 to move upwardly about the links 25 and 26 until, if desired, the links are substantially vertical, at which time the frame will be moved to its greatest distance above the base.

Figure 2:
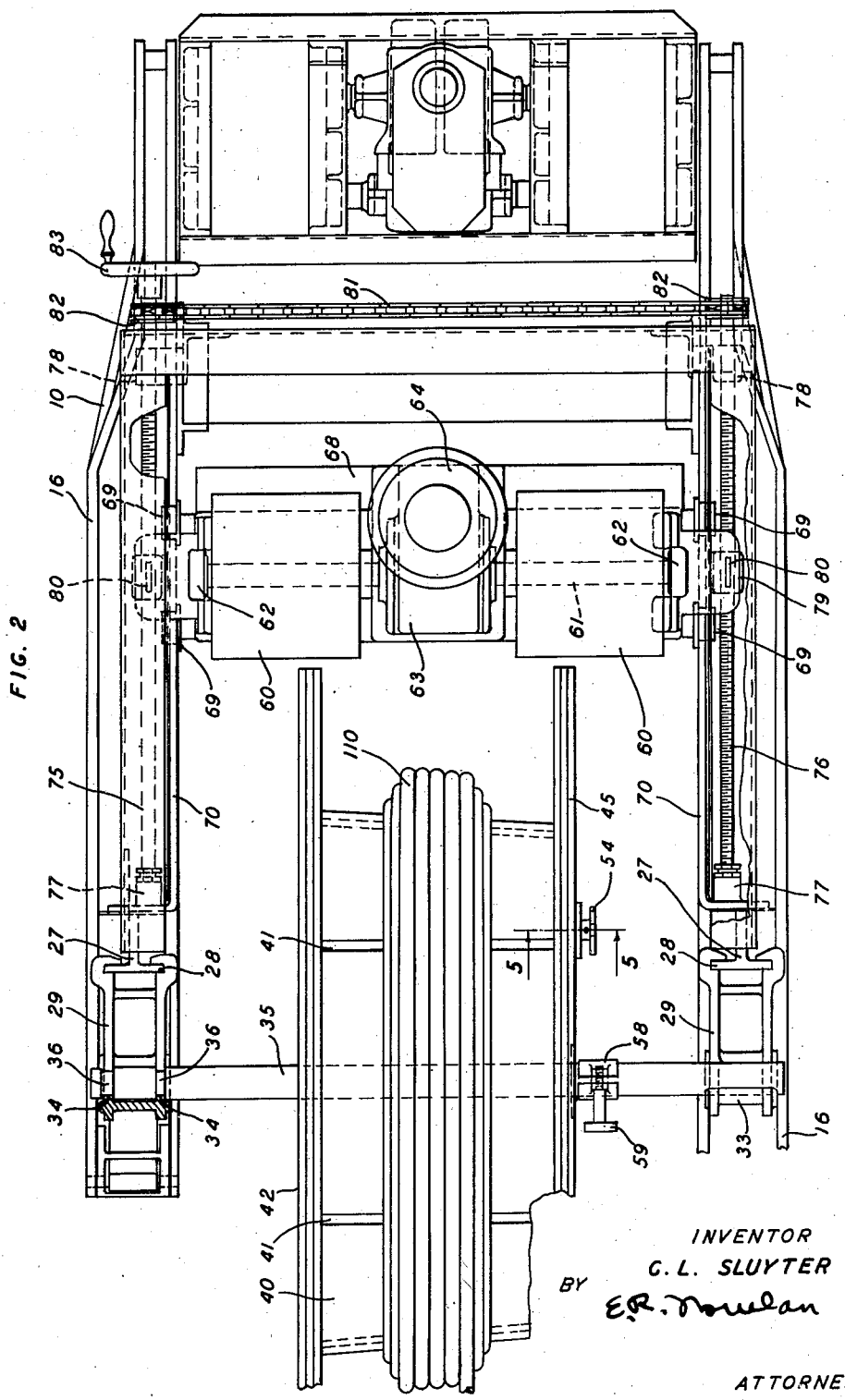
Fig. 2 is a top plan view of the apparatus, portions thereof being broken away.

By viewing Figs. 1 and 2 it will be observed that the frame 15 is substantially U-shaped in cross sectional contour, the forward vertical frame members 27 being mounted upon one of the lateral supports 19 and having guide ribs 28 for guiding supporting arms 29 in adjustment relative thereto. Weighted latches 30 pivotally carried by the arms 29 are positioned to interengage teeth 31 of the vertical frame members 27. The supporting arms 29 have hook-shaped ends 33 with arcuate retaining flanges 34 formed integral with the inner surfaces thereof. The hooked ends of the arms 29 are conditioned to receive ends of a supporting shaft 35, there being formed spaced grooves 36 in the ends of this shaft for receiving the arcuate flanges 34 so that the shaft may rotate in the arms and be held against displacement.

If desired a reel may be disposed upon the shaft to rewind thereon a desired length of cable. However, if lengths are desired which are shorter than those requiring the support of a reel for shipping, a reel of the type illustrated in Figs. 1 to 5 inclusive is employed.

This reel consists of a tapered drum 40 having spaced grooves 41 in its periphery extending the full width thereof. The drum 40 is fixed to one head 42 and has an end member 43 fixedly disposed in the opposite or smaller end thereof provided with studs 44 for the securing of a removable head 45 thereto. A hub tubular in contour, indicated at 46, extends through the drum 40 and the head 42, where it is fixed in place by flange 47, the opposite end of the hub extending outwardly from the end 43 and receivable in a central aperture of the removable head 45. Interfitting flanges 50 and 51 (Figs. 4 and 5) are provided at two positions in the removable head 45 to rotatably hold internally threaded members 53 conditioned to receive threaded ends of the studs 44, and through the aid of attached cross-shaped heads 54 the threaded members or ends 53 may be rotated to secure the removable head 45 onto the drum 40 or to remove the head therefrom, as desired. The head 45 has a split gripping flange 58 mounted upon the outer surface thereof adjacent the central aperture to receive the shaft 35 and through the aid of a hand screw 59 the flange may be caused to grip the shaft to hold the reel against movement relative thereto.

Means movable into and out of engagement with the heads of the reel is provided to cause rotation thereof when the frame 15 is moved into its upper position to lift the reel for rotation free of the floor. This means consists of spaced friction rollers 60 mounted upon a common shaft 61, the outer ends of which are journalled in bearing brackets 62 while the central portion thereof extends through a housing 63 wherein the shaft is further supported by the aid of bearings (not shown). In the housing 63 is disposed suitable mechanism (not shown), such as gears, to operatively connect the shaft 61 to a shaft of a motor 64. A suitable wiring circuit (not shown) may be provided for electrically connecting the motor 64 at will to a supply of electrical energy. The reel driving means just described, including the brackets 62 supporting the shaft 61 and the friction rollers 60, together with the housing 63 supporting the motor 64, is all mounted upon a carriage 68 extending substantially the full width of the frame 15 and having pairs of rollers 69 mounted upon the ends thereof. The pairs of rollers 69 ride between pairs of tracks 70 extending in parallel relation upon each side of the frame and having their ends fixed thereto.

Adjustable means is provided to cause movement of the reel driving means toward or away from the reel. This adjusting means consists of adjusting screws 75 and 76 disposed at each side of the frame with their forward ends rotatably journalled in bearings 77, their rearward portions extending through and journalled in bearings 78, while intermediate their ends these adjusting screws extend through internally threaded floating members or nuts 79 having flat projections 80 movable in apertures in parallel portions of their respective brackets to eliminate binding of the nuts on the screws. A chain 81, through the aid of sprocket wheels 82 mounted upon the rearward ends of the adjusting screws 75 and 76, operatively connects these screws to each other so that rotation of one will cause a like rotation of the other. A hand wheel 83 mounted upon the adjusting screw 75 provides means for manual rotation thereof and as rotation of the adjusting screw 75 will cause a like adjustment of the screw 76 through the chain 81, the carriage may be caused to move laterally relative to the reel. This adjustable feature of the carriage makes possible the use of the apparatus with reels having heads varying in diameter and the length of each friction roller assures engagement with reel heads varying in spacing.

In Figs. 6, 7 and 8 means is shown for securing a plain reel against displacement on the shaft 35. This means consists of retaining units indicated generally at 91 (there being two required but only one shown), each having an annular housing 92, with a hollow inner contour as illustrated in Figs. 6 and 7, providing shelves 93 upon which the outer ends of groups of gripping elements 94 may rest. The gripping elements are identical in formation, substantially square in contour with their outer edges curved to conform to the adjacent walls of the housing and their inner edges cured to conform to the periphery of the shaft 35. The inner edges, as illustrated in Fig. 6, are tapered forming knifelike edges positioned to engage the shaft. Helical compression springs 95 located upon pins mounted in the housing are positioned to engage each set of gripping elements to normally urge them into gripping engagement with the shaft. It will be observed that the outer ends of the gripping elements are nested in grooves or spaces in the housing, where they are limited in movement, and if movement is imparted to the groups of elements by the compressing springs 95 it is a tendency for the elements to move about their outer ends as fulcrums.

A cam plate 98 for each housing 92 is movably secured thereto by screws 99 disposed in arcuate elongate apertures 100 having enlarged portions forming a shoulder for the heads of the screws. The elongate apertures 100 permit movement of each cam plate 98 through a sufficient arc to actuate pins 101 to move the groups of gripping elements 94 away from the shaft against the force of the springs or to release the elements so that they may be moved by the springs into engagement with the shaft. The pins 101 extend through apertures in the housing 92 and the elements and have their inner ends conditioned, such as being formed with outwardly extending portions 102 to effectively engage the elements. The apertures in the elements through which the pins extend are of sufficient size to allow the necessary relative arcuate movement in moving the elements about their outer ends as fulcrums when moving from a position free of the shaft into gripping engagement with the shaft, and vice versa. The outer ends of the pins are provided with nuts or threaded members 103 of suitable contour to rest upon their respective tapered cam surfaces 104 with substantially flat surfaces engaging side walls 105 formed by arcuate apertures adjacent the cam surfaces.

The gripping elements, as shown in Figs. 6, 7 and 8, are disposed in gripping engagement with the shaft, these elements extending angularly with respect to a plane at right angles to the axis of the shaft to prevent movement of the reel to the right (Fig. 6). A similar retaining unit may be mounted upon the shaft adjacent the other head of the reel to prevent movement of the reel to the left. These units may be removed from the shaft by first moving the cam plate 98 counterclockwise (Fig. 7) relative to the housing 92 for the full distance allowed by the elongate apertures 100, causing the cam surfaces 104 to ride beneath the nuts 103, thus moving the pins 101 outwardly to move the gripping elements 94 arcuately against the force of their springs to move their inner ends free of the shaft.

Referring now to the operation of the apparatus, it will be observed, by viewing Fig. 1, that the frame 15 in this position is lowered with the reel resting upon the floor. The supporting arms 29 are originally in a lowered position so that the reel may be rolled in place or the apparatus may be moved to straddle the reel so that the shaft 35 will be in proper alignment with the supporting arms. The supporting arms 29 may then be moved upwardly and in so doing the latches 30 will ride over the teeth 31 until the supporting arms reach their uppermost position in engagement with the ends of the shaft 35. When both supporting arms are in their upward position and located so that the flanges 34 will extend into the annular grooves 36 the apparatus is then in a condition to raise the reel free of the floor. This may be done by causing actuation of the lifting members 21 to cause relative movement of the frame 15 and the base 10 controlled by the links 25 and 26. The frame 15 is thus moved upwardly, positioning a reel a desired distance from the floor so that the reel may be rotated. The apparatus in this condition may be moved to a satisfactory position relative to a supply reel containing cable, a desired length of which is to be removed and wound upon the drum 40. When the apparatus has been located the end of the cable may be secured to the drum 40 in any suitable manner, after which the friction rollers may be moved into intimate engagement with the heads of the reel. This is brought about by the rotation of the adjusting screw 75 through the aid of the hand wheel 83 and through the aid of the chain 81 screws 75 and 76 are rotated simultaneously to cause movement of the carriage 68. The carriage 68 is supported by the rollers 69 which ride between the pairs of tracks 70, the lower track of each pair serving as a general support for the carriage and the mechanism carried thereby, while the upper track of each pair retains the carriage against tipping. By energizing the motor 64 the drum 40 may be rotated in the direction of the arrow (Fig. 1), causing the cable indicated at 110 to wind thereupon, the convolutions of the cable being guided, if desired, by any suitable distributing means (not shown) so as to form the coils of the cable in a desired arrangement, for example as illustrated in Figs. 2 and 3.

After the desired length of cable has been removed and wound upon the reel the operator may pass lengths of cord or the like beneath the convolutions of the cable at each of the grooves 41 and by drawing the ends of the cords around the cable they may be securely tied as illustrated in Fig. 3. After this has been accomplished the length of cable may be severed from the supply, the carriage 68 moved to move the friction rollers 60 free of the reel, and the frame 15 lowered to the position shown in Fig. 1. When the reel is again located upon the floor the supporting arms 29 may be lowered out of engagement with the shaft 35 by moving the latches 30 free of the teeth 31 and the reel may be conditioned so as to remove the length of cable therefrom. This may be accomplished by first removing the shaft 35, if so desired, after loosening the gripping flange 58, or the shaft may be left connected to the head 45 and removed from the main portion of the reel by disconnecting the threaded members 53 from the studs 44. The drum 40 is then in the condition shown in Fig. 3, and due to the tapered or conical shape of the drum it is possible for the operator to easily remove the tied length of cable therefrom.

To condition the apparatus for further use the drum 40 is re-assembled with its head 45 and shaft 35 and again positioned to be supported by the supporting arms 29. If desired, a plain reel may be mounted upon the shaft 35, raised with the frame 15, and rotated by the friction rollers 60. Such a reel might be used when the length of cable desired necessitates the support of a reel and cannot be transported readily in a tied coil, as illustrated in Fig. 3.

The embodiments of the invention herein disclosed are illustrative only and may be modified and widely departed from in many ways without departing from the spirit and scope of the invention as pointed out in and limited only by the appended claims.

What is claimed is:

1. A cable reeling apparatus comprising a frame, spaced arms carried thereby, a shaft removably supported by the arms, a reel disposed on the shaft, means to adjustably locate the arms on the frame for engagement with the shaft, means to adjust the frame to lift the reel for rotation, and means carried by the frame to rotate the reel to cause winding of cable thereon.

2. A cable reeling apparatus comprising a frame, spaced arms slidably carried thereby, a shaft, a reel disposed on the shaft, means to adjustably locate the arms on the frame for engagement with the shaft, means to adjust the frame to lift the reel for rotation, and means carried by the frame to rotate the reel to cause winding of cable thereon.

3. A cable reeling apparatus comprising a frame, a shaft rotatably carried by the frame for singly supporting reels varying in size, a reel disposed upon the shaft, means to adjust the frame to lift the reel for rotation, a carriage mounted for movement on the frame, a driving roller carried thereby, adjusting screws carried by the frame and connected to the carriage, and means to connect the adjusting screws to cause simultaneous movement of both screws upon movement of one to move the carriage to move the driving roller into driving engagement with the reel.

4. A cable reeling apparatus comprising a frame, spaced arms carried thereby, a shaft removably supported by the arms, a reel removably disposed upon the shaft, means to adjust the frame to lift the reel for rotation, a carriage mounted for movement on the frame, a driving roller carried thereby, adjusting screws carried by the frame and connected to the carriage, and means to connect the adjusting screws to cause simultaneous movement of both screws upon movement of one to move the carriage to move the driving roller into engagement with the reel.

CHARLES L. SLUYTER.